United States Patent
Gupta et al.

(10) Patent No.: US 10,841,193 B2
(45) Date of Patent: Nov. 17, 2020

(54) MONITORING QUALITY OF SERVICE

(71) Applicant: Hughes Network Systems, LLC, Germantown, MD (US)

(72) Inventors: Vivek Gupta, Clarksburg, MD (US); Zili Qian, Germantown, MD (US); Szuyuan Huang, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/409,399

(22) Filed: May 10, 2019

(65) Prior Publication Data

US 2019/0268252 A1    Aug. 29, 2019

Related U.S. Application Data

(62) Division of application No. 14/873,362, filed on Oct. 2, 2015, now Pat. No. 10,361,940.

(51) Int. Cl.
| | |
|---|---|
| *H04L 12/26* | (2006.01) |
| *H04L 29/06* | (2006.01) |
| *H04L 29/08* | (2006.01) |
| *H04L 12/24* | (2006.01) |

(52) U.S. Cl.
CPC ...... *H04L 43/0888* (2013.01); *H04L 43/0817* (2013.01); *H04L 43/16* (2013.01); *H04L 65/1066* (2013.01); *H04L 65/80* (2013.01); *H04L 41/5074* (2013.01); *H04L 43/0823* (2013.01); *H04L 43/50* (2013.01); *H04L 67/06* (2013.01)

(58) Field of Classification Search
CPC .................................................. H04L 43/0888
See application file for complete search history.

(56) References Cited

U.S. PATENT DOCUMENTS

| | | |
|---|---|---|
| 6,832,085 B1 | 12/2004 | McDonagh et al. |
| 7,120,633 B1 | 10/2006 | Kromer |
| 8,462,625 B2 | 6/2013 | Pang et al. |
| 8,903,894 B2 | 12/2014 | Dillon |
| 9,860,111 B2 | 1/2018 | Kerpez et al. |
| 2004/0088409 A1 | 5/2004 | Braemer et al. |
| 2005/0220240 A1 | 10/2005 | Lesso |

(Continued)

FOREIGN PATENT DOCUMENTS

WO    2007021387 A3    4/2009

OTHER PUBLICATIONS

Zangrilli, Marcia et al.; Applying Principles of Active Available Bandwith Algorithms to Passive TCP Traces; College of William and Mary, Williamsburg, VA 23187 (4 pages).

*Primary Examiner* — Andrew C Georgandellis
(74) *Attorney, Agent, or Firm* — Bejin Bieneman PLC

(57) ABSTRACT

A system comprises a first computing device including a processor programmed to define a plurality of download slots during a download session, each of the download slots being a predetermined period of time. The processor further selects download slots from the plurality of download slots during which a first amount of data in the download buffer remained greater than or equal to a first predetermined threshold. For each of the selected download slots, the processor determines a first download throughput rate. The processor calculates a session download throughput rate based on the first download throughput rates, and reports the session download throughput rates to a second computing device.

19 Claims, 3 Drawing Sheets

(56) References Cited

U.S. PATENT DOCUMENTS

| | | |
|---|---|---|
| 2008/0055043 A1 | 3/2008 | Webb et al. |
| 2009/0054001 A1 | 2/2009 | Westerberg et al. |
| 2012/0054785 A1 | 3/2012 | Yang et al. |
| 2012/0209911 A1 | 8/2012 | Siganos et al. |
| 2014/0095731 A1 | 4/2014 | Carey et al. |

MONITORING QUALITY OF SERVICE

CROSS-REFERENCE TO RELATED APPLICATIONS

This patent application is a divisional of and claims priority to and all advantages of U.S. patent application Ser. No. 14/873,362 filed on Oct. 2, 2015, which is herein incorporated by reference in its entirety.

BACKGROUND

A slow response of a digital network such as the Internet during data transfer operations is a potential source of dissatisfaction for consumers of network services. Quality of service metrics such as download throughput and upload throughput, as experienced by a user, provide an indication of network performance, but are sometimes difficult to obtain.

DRAWINGS

DETAILED DESCRIPTION

Exemplary System

Quality of service (QoS) metrics for digital network communications can be obtained with advantageous efficiency and accuracy as disclosed herein. These QoS metrics include download throughput and upload throughput, and can advantageously be obtained for communications with user equipment without interaction with the user, and without the installation of special equipment at the user premises or software on user equipment. A network provider such as an internet service provider (ISP) can use the obtained QoS metrics to optimize network operations, to quickly identify and correct performance issues within a network, and in many cases, to identify potential issues with equipment at the customer premises.

Figure 1:
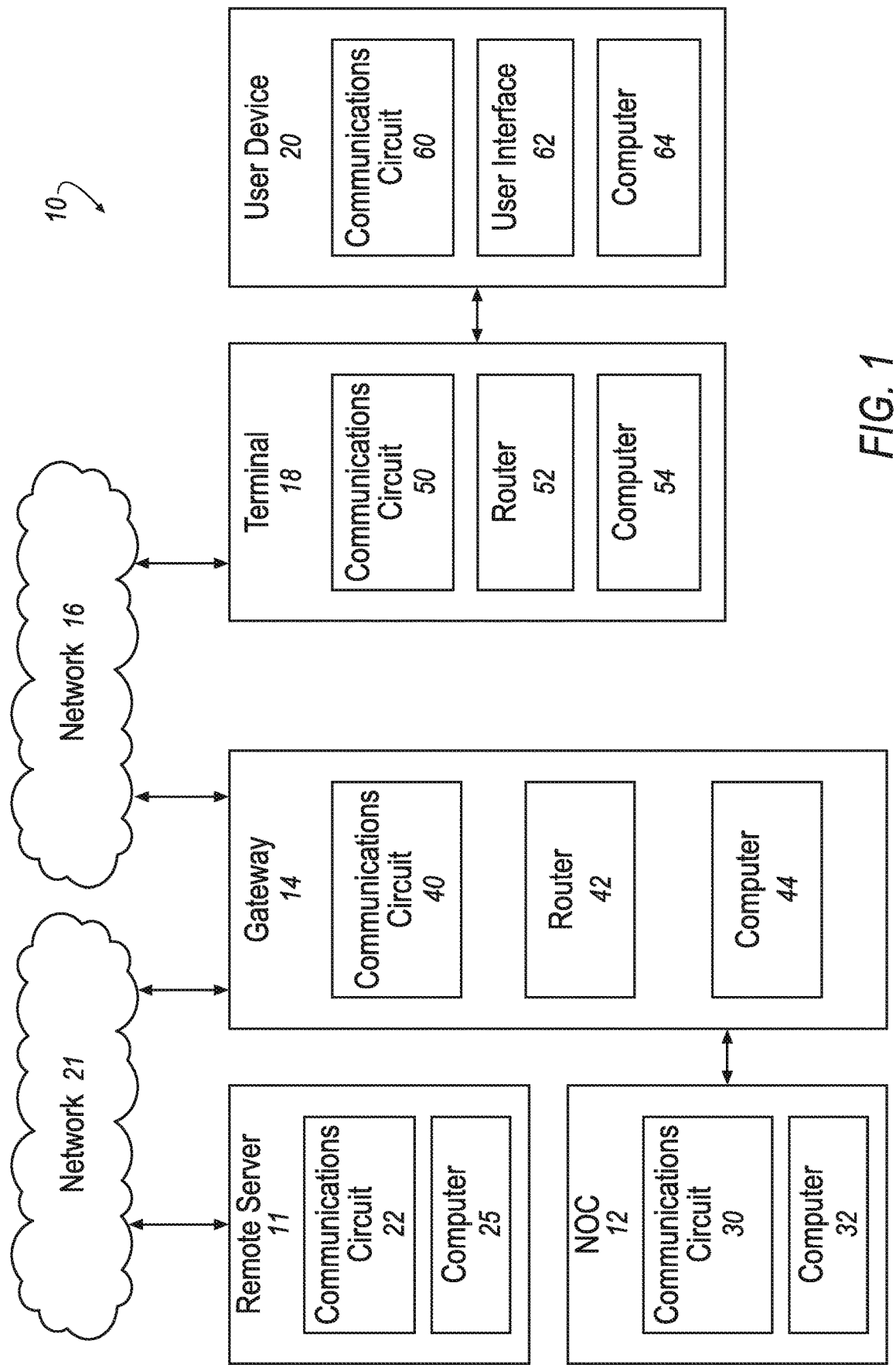
FIG. 1 is a diagram of an exemplary system for measuring quality of service metrics for a network.

Referring to FIG. 1, a system 10 for monitoring the quality of service of internet network provider (ISP) includes a Network Operations Center (NOC) 12, one or more gateways 14, one or more first networks 16, one or more terminals 18, one or more user devices 20, one or more remote servers 11 and a second network 21. The first network 16 may be, e.g., a satellite network, a terrestrial wireless network, or a combination of both, as described below. The second network 21 may be, for example, one or more of various wired or wireless communications mechanisms, also as described below. The Internet is an example of the second network 21. The remote server 11 is communicatively coupled with the one or more gateways 14 via a second network 21, e.g., an internet carrier, and may communicate with the one or more user devices 20 via a communications path that includes the gateway 14, the wireless network 16 and the terminal 18. Additionally, each of the NOC 12 connects to the one or more gateways 14 via a terrestrial network provider, e.g., a multiprotocol label switching (MPLS) circuit or a T1 (high speed digital network) line.

As described in detail below, the gateway 14 together with the terminal 18 may be programmed to measure performance metrics such as download throughput and upload throughput with individual user devices 20 and provide data related to the metrics (hereinafter metrics data) to a computer 32 in the NOC 12. The computer 32 may be programmed to receive and analyze the metrics data, and report the analysis results. When applicable, the computer 32 may be further programmed to alert operators and other computing devices (the gateways 14, first networks 16, terminals 18, user devices 20, etc.) of issues which may require attention, such as potential network faults, potential device failures, performance metrics that are out of specification, etc. The computer 32 may further be programmed, e.g., to command computer 54 to perform a plurality of diagnostic tests, e.g. checking CPU and memory usage of various processes, restarting processes that may be out of specification with expected behavior, reinitializing and reconfiguring terminal 18, reacquiring satellite signal and recalibrating timing and power needed to communicate with gateway 14 and executing a download and upload speed test with a computer 44 in gateway 14 after each of the listed steps. Based on the results, e.g., when the computer 54 detects a fault condition, the computer 32 may open a service ticket for the terminal 18 and schedule a technician visit to repair terminal 18.

Generally, each of the computing devices associated with the system 10, e.g., the computer 25 in remote server 11, the computer 32 in the NOC 12, one or more computers 44 in one or more gateways 14, one or more wireless networks 16, one or more computers 54 in one or more terminals 18, and one or more computers 64 in one or more user devices 20 includes one or more processors which may be programmable to execute computer programs. Unless explicitly or from context specified otherwise, an operation described as being performed by one of the computing devices 16, 25, 32, 44, 54, 64 may additionally or alternatively be performed wholly or in part by one or more of the other computing devices 16, 25, 32, 44, 54, 64.

Various types of communications may be provided in the system 10, e.g., Internet or other packet network access, telephone communications, Voice over IP (VoIP), streaming audio and video transmissions, file sharing, etc. The communications may be between the remote server 11 and the user device 20. In some cases, for example, in the case of executing network metric tests, the communications may be between, e.g., the terminal 18 and the gateway 14.

Communications between the first network 16 and the gateway 14 or terminal 18, may be satellite communications, wireless terrestrial communications, or a combination of satellite and wireless terrestrial communications, and may be conducted in the Ka band, a radio frequency band from 29.5 to 30.0 GHz.

Other frequency bands may be used for satellite communications. Examples of other suitable frequency bands for use by the system 10 are the C-band from 5.85 to 6.725 GHz, and the Ku band from 12 to 14 GHz.

The Network Operations Center (NOC) 12 is a central entity that hosts network management functions and business systems related to the system 10. The NOC 12 may communicate with one or more gateways 14 substantially simultaneously, and manage large amounts of data related to gateways 14, terminals 18 and user devices 20.

As further shown in FIG. 1, the NOC 12 may include a communications circuit 30 and the computer 32. The computer 32 may be communicatively coupled to the communications circuit 30 and programmed to send and receive messages via the communications circuit 30.

The communications circuit 30 is configured to communicate with the gateway 14, and may include a transceiver for communications over, e.g., a wired and/or wireless network. The communications circuit 30 may include circuitry as is known, e.g., one or more decoders, to extract digital messages from bus communications, and to provide the digital messages to the computer 32. Further, the communications circuit 30 may include circuitry as is known, e.g., one or more sets of encoders, to generate bus compatible transmissions from digital messages that it receives from the computer 32, and transmit those messages to the gateway 14.

The computer 32 may include a memory and a processor, the processor programmed to execute programs stored by the memory. The computer 32 may be programmed to receive data related to system 10 performance metrics such as download throughput and upload throughput for communications with one or more user devices 20, analyze the metric data, and report the results. When applicable, the computer 32 may issue warnings with regard to system 10 faults, performance metrics that are out of specification, etc.

Additionally, the computer 32 may command computer 54 to execute a set of diagnostic tests. The diagnostic tests may include, e.g., checking CPU and memory usage of various processes, restarting processes that may be out of specification with expected behavior, reinitializing and reconfiguring terminal 18, reacquiring satellite signal and recalibrating timing and power needed to communicate with gateway 14 and executing a download and upload speed test with a computer 44 in gateway 14 after each of the listed steps. Based on the results, e.g., when the computer 54 detects a fault condition, the computer 32 may open a service ticket for the terminal 18 and schedule a technician visit to repair terminal 18.

The remote server 11 may be one or more computing devices that hosts, for example, computer based applications, cloud based utilities, web pages, etc., and may be communicatively coupled with the second network 21. The remote server 11, via the second network 21, gateway 14, first network 16, and terminal 18, may communicate with the user device 20. For example, the remote server 11 may allow a user to download data to the user device 20 and upload data from the user device 20.

As shown in FIG. 1, the remote server 11 may include a communications circuit 22 and a computer 25. The computer 25 may be communicatively coupled to the communications circuit 22.

The communications circuit 22 may be configured to communicate with the second network 21, and may include one or more wired or wireless transceivers for network communications. The communications circuit may further include one or more decoders/encoders for converting digital messages to and from the computer 25 to bus compatible signals for communications via the second network 21.

The computer 25 may include a memory and a processor, the processor programmed to execute programs stored by the memory. The computer 25 may generally be programmed for communications with the second network 21. Specifically, the computer 25 may be programmed to, download data to the user device 20 and upload data from the user device 20.

The gateway 14 is typically a land-based transmission system such as is known and hosts a number of radio frequency (RF), baseband transport and gateway 14 specific management functions. The gateway 14 may communicate with multiple terminals 18 substantially simultaneously, and generate radio frequency transmissions at power levels sufficient to use first network 16. As shown in FIG. 1, the gateway 14 may include a communications circuit 40 and the computer 44.

The communications circuit 40 may be configured to communicate with the NOC 12 and additionally with the first network 16. For example, the communications circuit 40 may include a first transceiver for bus communications from the NOC 12 and a second transceiver for radio frequency (RF) communications with the first network 16. The communications circuit 40 may further include a first set of encoder and decoder circuitry for converting digital messages to and from the computer 44 to bus compatible signals for communications with the NOC 12. The communications circuit may further include a second set of encoder and decoder circuitry for converting digital messages to and from the computer to radio frequency signals for communications with the first network 16.

The computer 44 is communicatively coupled with the communications circuit 40, and includes a memory and a processor. The processor is programmed to execute computer instructions stored by the memory. The computer 44 is generally programmed to communicate with each of the NOC 12 and the first network 16 via the communications circuit 40. Additionally, the computer 44 is programmed to measure quality-of-service metrics related to communications between the remote server 11 and the one or more user devices 20 and provide metrics data related to the measurement results to the NOC 12 for analysis.

For example, the computer 44 may be programmed to measure one or more of download throughput and upload throughput for communications between the remote server 11 and the user device 20. Download throughput is defined as a quantity of data per unit of time that is transmitted from the remote server 11, via the gateway 14, the first network 16 and the terminal 18 to the user device 20, and may be measured, for example, in units of megabits per second (Mbits/second). Upload throughput is defined as an amount of data per unit of time that is transmitted from the user device 20 to the remoter server 11, via the terminal 18, the first network 16 and gateway 14, and may be measured, for example in units of megabits per second (Mbits/second).

As described below for each of the quality of service metrics, the computer 44 may be programmed to detect a first trigger event for initiating a measurement of the metric. The computer 44 may conduct the measurement for a predetermined period of time, or until a second trigger event for terminating the measurement is detected. The computer 44 determines whether the measurement was valid, based on one or more validity criteria. In a case where the measurement is determined to have been valid, the computer 44 may provide data related to the measurement to the NOC 12 for analysis.

The first network 16 includes a radio frequency (RF) relay station such as is known. The first network 16 relays outbound signals from the gateway 14 to the terminal 18 and further relays return signals from the terminal 18 to the gateway 14. The first network 16 also includes, as is known, a computing device having a processor and a memory storing computer-executable code, such computing device being capable of executing various operations attributed herein to the first network 16.

The terminal 18 is typically a communications device for providing network access for one or more user devices 20. The terminal 18 may include a communications circuit 50, a router 52 and a computer 54. The computer 54 may be communicatively coupled to the communications circuit 50 and the router 52.

The communications circuit 50 may be configured for communications with the first network 16 and may include a transceiver for radio frequency (RF) communications. The communications circuit 50 may further include a first set of encoder and decoder circuitry for converting digital messages to and from the computer 54 to radio frequency signals for communications with the first network 16. As described above, the radio frequency signals may be, e.g., in the Ku-band, the C-band, the Ka-band, or another frequency range.

The router 52 may be configured for communications with one or more user devices 20 and may be operable to receive multiple transmissions substantially simultaneously. The router 52 may include, e.g., a radio frequency (RF) transceiver for WiFi communications (typically 2.4 GHz or 5 GHz bands), and may further include, e.g., a transceiver for communications on a wired bus, e.g., an Ethernet bus, with one or more user devices 20. The router 52 may include one or more encoders and one or more decoders for converting digital messages to/from RF signals and for converting signals to/from bus compatible signals.

The terminal 18 further includes the computer 54 which includes a memory and a processor. The processor is programmed to execute computer instructions stored by the memory. The computer 54 may generally be programmed to receive communications from the user device 20 via the router 52, and transmit the communications via the communications circuit 50 to the first network 16, and similarly to facilitate communications from the first network 16 to the user device 20.

The user device 20 is generally a computing device such as a desktop computer, laptop, tablet, mobile telephone, etc. which may be used by a user to access the network, e.g., including the Internet. As shown in FIG. 1, the user device 20 may include a communications circuit, 60, a user interface 62 and computer 64. The computer 64 may be communicatively coupled with the communications circuit 60 and the user interface 62.

The communications circuit 60 may include one or more transceivers for communicating with the terminal 18. For example, the communications circuit may include a wireless transceiver for WiFi communications with the router 52 of terminal 18. Additionally or alternatively, the communications circuit 60 may include a transceiver for wired bus communications, for example on an Ethernet bus, with the terminal 18. The communications circuit may include one or more sets of encoders/decoders as are known for converting digital messages to/from RF signals and for converting signals to/from bus compatible signals.

The user interface 62 is communicatively coupled to the computer 64, and may include one or more output devices such as a display, lamps, speakers, etc. for communicating information to the user. The user interface 62 may further include one or more input devices such as buttons, a touch screen display, a mouse, a keyboard, a gesture recognition device, switches, etc., for receiving input from the user.

The user device 20 further includes the computer 64 which includes a memory and a processor. The processor is programmed to execute computer instructions stored by the memory. The computer 64 is communicatively coupled with the user interface 62 and the communications circuit 60, and may be programmed, for example, to receive user instructions via the user interface 62, and communicate the user instructions via the computer 64 to the terminal 18. Further, the computer 64 may be programmed, for example, to download and upload data, such as a web page, file sharing, email receive and send, streaming audio and video etc, to a remote server 11 via the communications circuit 60, and display the corresponding data on the user interface 62.

The second network 21 represents one or more mechanisms by which the gateway 14 may communicate with remote computing devices such as the remote server 11, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), providing data communication services. The second network 21 may, but does not necessarily, include the Internet.

The Network Operation Center (NOC) 12 computer 32 may perform a supervisory role for measuring, analyzing and reporting of quality of service metrics. For example, the NOC 12 computer 32 may send a request to one or more gateways 14 requesting that a quality of service metric be measured for a particular category of terminals 18. Categories of terminals 18 may include, e.g., terminals 18 being serviced by a particular wireless cell or satellite beam, terminals 18 sharing a common first network 16 resource such as a satellite outroute carrier or a set of satellite inroute channels, terminals 18 operating within a common subscription plan, within a specified level of service, terminals 18 sharing a common hardware or software platform, etc. In this manner, the NOC 12 computer 32, or an operator of the NOC 12, may gather data with respect to the particular category of terminals 18, and identify one or more terminals 18 that consistently show lower metrics as compared to the other terminals 18 sharing the same network 16 resources or serviced by the same wireless cell or satellite beam. Furthermore, the NOC 12 computer 32 may command such terminals 18 to execute one or more diagnostic tests as described above. Based on the test results, the computer 32 may open a service ticket and optionally, schedule a technician visit to repair terminal 18.

A computing device within the system 10, for example the gateway 14 computer 44, or the terminal 18 computer 54, may identify trigger events to perform the download and upload throughput measurements. The computing device 44, 54 may then execute one or more measurements as described below, and report the results of the measurement to the NOC 12 (e.g., to the computer 32).

Upon receiving the results, the NOC 12 computer 32 may aggregate and analyze the results. For example, the computer 32 may request download throughput be measured for all user devices 20 operating under a particular subscription plan. Each gateway 14 may execute download throughput measurements for terminals 18 being serviced by the particular gateway 14, e.g., according to instructions executed in a computer 44, and provide the measurement results to the NOC 12.

Based on the received measurement results, the computer 32 may be able to identify whether terminals 18 are experiencing download throughput that is within users' subscription plan specifications. The computer 32 may further command terminals 18 to perform diagnostic analysis, and/or identify adjustments that need to be made to the system 10.

For example, the NOC 12 computer 32 may analyze whether a particular gateway 14, a particular first network 16, a particular terminal 18, etc. is performing outside of specification. Based on the analysis, the computer 32 determines, for example, that the system 10 may be optimized for download throughput by adjusting the second network 21 resource allocation or moving terminal 18 to a different outroute carrier within second network 21. The NOC 12 may further identify that a particular gateway 14 is performing outside of specification, and alert an operator so that appropriate remedial actions may be undertaken.

The terminal 18 may be configured to execute diagnostic tests when commanded by NOC 12 computer 32 and provide the results of the tests back to NOC 12 computer 32. The diagnostic tests may include, e.g., checking CPU and memory usage of various processes, restarting processes that may be out of specification with expected behavior, reinitializing and reconfiguring terminal 18, reacquiring satellite signal and recalibrating timing and power needed to communicate with gateway 14 and executing a download and upload speed test with a computer 44 in gateway 14 after each of the listed steps.

As described below, measurement of download throughput and upload throughput may be made in a manner that is transparent to, and does not require actions to be taken by, one or more user devices 20. Furthermore, automated action may be taken to schedule a repair visit for one or more terminals with lower metrics, without requiring the user to call the support center and having to manually measure download and upload throughput and perform diagnostics. Accordingly, the operator of the system 10 may optimize/maintain the system 10 and improve user satisfaction.

Exemplary Process Flows

The system 10 is programmed to perform quality of service measurements for one or more metrics related to system performance as experienced by the user. Advantageously, the measurements may be performed using technical mechanisms that operate in a manner transparent to, and without requiring any actions to be taken by a user of, the user device 20. Further, the measurements may be performed without the installation of software in the user device 20, or the installation of test-specific hardware at the user premises. The measured performance metrics may include download throughput and upload throughput. A process for measuring each of these metrics is discussed below.

Download Throughput Measurement

Figure 2:
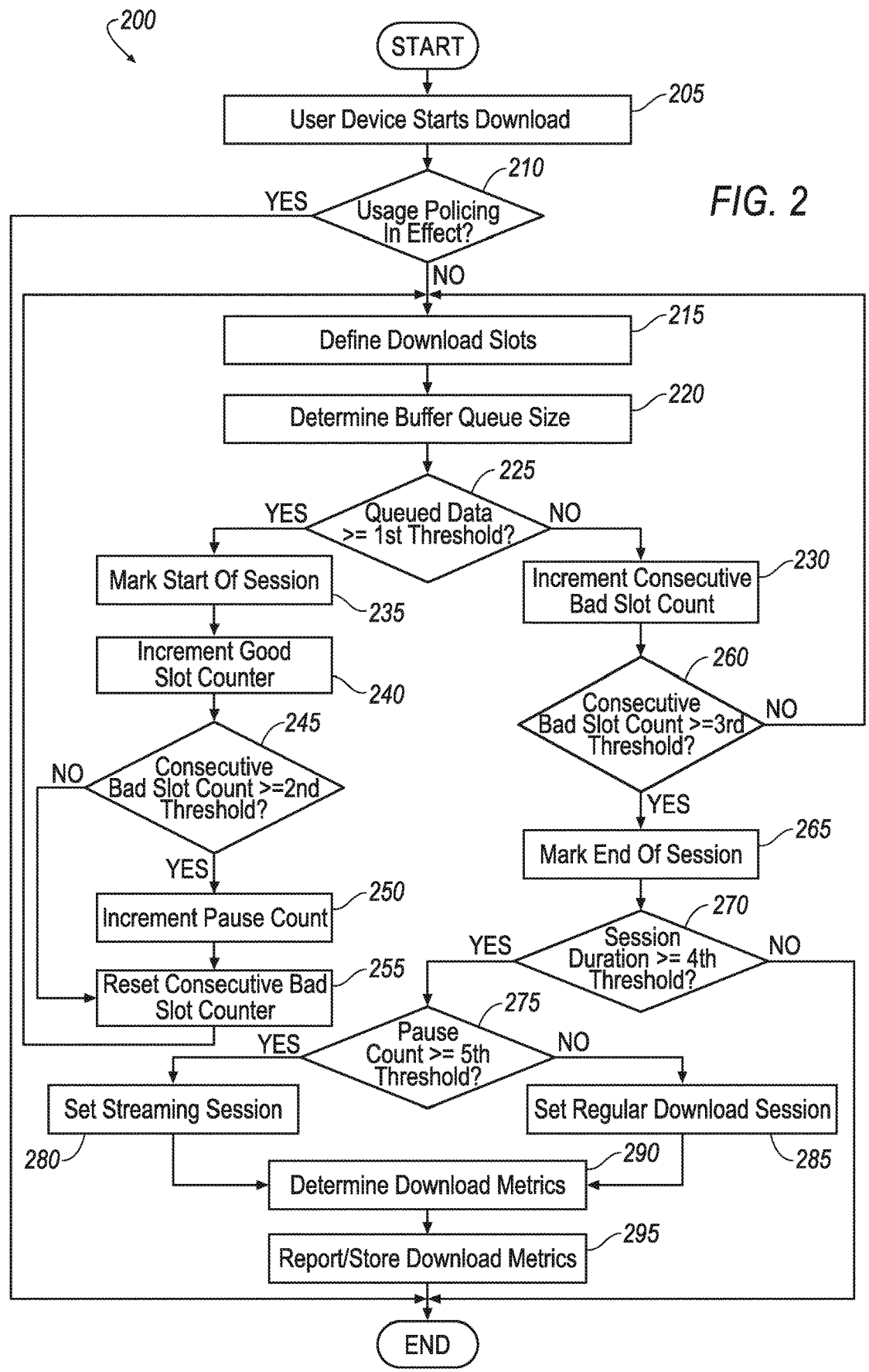
FIG. 2 is a diagram of an exemplary process for measuring download throughput for a network.

Download throughput is a metric for the speed at which data can be transferred from the remote server 11 to the user device 20, and is expressed in units of megabits per second (Mbits/s). The download throughput measurement may be initiated and controlled by the gateway 14, e.g., according to programming in a computer 32. FIG. 2 is a diagram of an exemplary process 200 for measuring download throughput. The process 200 starts in a block 205.

In the block 205, the remote server 11 computer 25 receives, for example from the user device 20 via the terminal 18 and gateway 14, a request to download data. For example, the user device 20 computer 64 may transmit a request to download a software package, a movie or other media content item. The remote server 11 computer 25 initiates the download and gateway 14 computer 44 starts receiving packets for the download session. The download session may be defined as the period of time from the beginning to the end of downloading the media content item. The gateway 14 computer 44 may place the media content item in a download buffer, in preparation for transmission to the user device 20. The gateway 14 computer 44 initiates a download throughput measurement. The process 200 then continues in a block 210.

In the block 210, the gateway 14 computer 44 determines whether the terminal 18 is subject to usage policing. Usage policing, if in effect, may limit the download throughput for terminal 18, so gateway 14 computer 44 doesn't proceed with download throughput measurement in this case and the process 200 ends. In the case the terminal 18 is not subject to usage policing, the process 200 continues in a block 215.

In the block 215, the gateway 14 computer 44 divides the download session into a plurality of session slots, each session slot being a period of time. For example, the gateway 14 computer 44 may define a session slot to be 20 milliseconds (ms) long. A first session slot may start at a beginning of the download session, and extend for 20 ms. A second session slot may be begin at 20 ms, and end at 40 ms, etc. There may, for example, be 500 session slots in a minimum download session which is ten seconds long.

Defining the session slots may occur dynamically while the download session is in progress. For example, a beginning time may mark the beginning of the first session slot. After a period of time equal to a slot length, e.g., 20 milliseconds (ms), has passed, the gateway 14 computer 44 may determine that the first session slot has ended, and that the second session slot has begun. After identifying the beginning time, and the length of the session slots, the process 200 continues in a block 220.

In the block 220, the gateway 14 computer 44 monitors the download buffer to determine the amount of data in the download buffer during a session slot. The download buffer may be monitored in one or more various ways. For example, the gateway 14 computer 44 may determine a minimum number of bytes in the download buffer during the download slot by continuously monitoring the number of bytes of data queued, and identifying and tracking minimum levels of data queued at any time during the session slot. Additionally or alternatively, the number of bytes of data queued may be sampled, for example once every 5 ms, and an average determined based on the samples. Other statistical values of the number of bytes of data queued may be generated, such as median value during the session slot, standard deviation, etc. When the session slot has ended, the process 200 continues in a block 225.

In the block 225, the gateway 14 computer 44 determines whether the amount of data queued in the download buffer, as represented by the statistical value generated in the block 220, is greater than or equal to a first predetermined threshold. The first predetermined threshold may be a value that indicates that there was sufficient data available during the just-ended session slot, such that a rate of data transmission was not limited by availability of data during the session slot. The first predetermined threshold may be calculated, e.g., to be a percentage of a plan rate applicable to a user device 20 receiving the downloaded data.

In the case that the download buffer size is determined to be less than the first predetermined threshold, the gateway 14 computer 44 may determine that the just passed session slot was a bad session slot. A bad session slot is defined as a session slot during which download throughput may have been limited by the availability of data. Upon identifying that the just ended session slot was a bad session slot, the process 200 continues in a block 230.

In the case that the download buffer size is determined to be greater than or equal to the first predetermined threshold, the gateway 14 computer 44 may determine that the just ended session slot was a good session slot. A good session slot is defined as a session slot during which download throughput was not limited by the availability of data. Upon a determination that the just ended session slot was a good session slot, the process 200 continues in a block 235.

In the block 235, the gateway 14 computer 44 marks, in the case that a current download session was not already underway, the start of the download session corresponding to terminal 18. In a case that a current download session is already underway, the gateway 14 computer 44 may update some statistical parameters, e.g. average download buffer size and total bytes downloaded so far. The process continues in a block 240.

In the block 240 the gateway 14 computer 44 increments a good slot counter. The good slot counter tracks the number of good slots during a download session. The process continues in a block 245.

In the block 245, the gateway 14 computer 44 checks to see whether the download slot prior to the most recent download slot was a bad slot. In the case that it was a bad slot, the gateway 14 further checks to see whether the consecutive bad slot count exceeded the second threshold. In the case that the second threshold was exceeded, the process 200 continues in a block 250. Otherwise, the process 200 continues in a block 255.

In the block 250, the gateway 14 computer 44 increments a pause counter. The pause counter indicates cases in which the download buffer didn't have enough data to sustain a continuous download to terminal 18, so it appears to be a pause in the download session. Pauses are most often seen in streaming applications since such applications typically have wait periods while the downloaded data is played on a device such as a television monitor or a tablet or personal computer (PC) monitor. The process 200 continues in a block 255.

In the block 255, the gateway 14 computer 44 resets the consecutive bad slot count, so that measurements for a next download slot can be made. The process 200 then continues in a block 215.

In the block 230, which may follow the block 225, the gateway 14 computer 44 increments a bad slot counter. The bad slot counter tracks a number of bad slots during a download session. The process continues in a block 260.

In the block 260, the gateway 14 computer 44 compares the number of bad slots as stored by the bad slot counter with a third predetermined threshold. The third predetermined threshold may be, for example 250 slots. In the case that the number of bad slots is less than the third predetermined threshold, the download session may be considered to still be a valid download session for measuring download throughput metrics. The process 200 then continues in the block 215 where a next download slot is measured.

In the case that the number of bad slots is greater than or equal to a third predetermined threshold, the process 200 continues in a block 265.

In the block 265, the gateway 14 computer 44 marks the end of the download session for terminal 18. The process 200 continues in a block 270.

In the block 270, the gateway 14 computer 44 determines whether the number of good slots, as represented by the good slot counter, is greater than or equal to a fourth predetermined threshold. The fourth predetermined threshold may be, e.g., a minimum number of slots required for a successful measurement of a download session. For example, it may be determined that a minimum of 500 good slots, representing ten seconds of download time during which the download throughput was not limited by the availability of data, is sufficient for measurement of download throughput. In the case that the number of good slots is less than the fourth predetermined threshold, the process 200 ends. In the case that the number of good slots is greater than or equal to the fourth predetermined threshold, the process 200 may continue in a block 275.

In a block 275, the gateway 14 computer 44 determines whether the pause counter is greater than or equal to a predetermined fifth threshold. If the pause counter is greater than or equal to a fifth threshold, it indicates that the most recent download session was a streaming session and the process 200 continues in a block 280. If the pause counter is less than the fifth threshold, the process 200 continues in a block 285.

In the block 280, the gateway 14 computer 44 sets a download session type flag to Streaming Session. The process 200 continues in a block 290.

In the block 285 that may follow from block 275, the gateway 14 sets the download session type flag to Regular Download Session. The process 200 continues in a block 290.

In the block 290, the NOC 12, e.g., the computer 32 may determine the download throughput metrics for the download session. For example, the NOC 12 computer 32 may receive the download throughput data for one or more download sessions from the gateway 14 computer 44. The NOC 12 computer 32 may calculate statistical values such as the average download throughput, the maximum download throughput, the minimum download throughput, the standard deviation of the download throughput corresponding respectively to the one or more download sessions received from the gateway 14. The process 200 continues in a block 295.

In the block 295, the NOC 12 computer 32 stores the download metrics, e.g., in a memory or storage associated with the computer 32. Additionally or alternatively, the NOC 12 computer 32 may issue reports or warnings to one or more of the communicatively coupled devices associated with the system 10, for example with the one or more gateways 14 computers 44, one or more first networks 16, one or more second networks 21, and one or more terminal 18 computers 54. Specifically, in the case that the NOC 12 computer 32 determines that the download throughput is outside of a specified range, the NOC 12 computer 32 may issue a warning, for example to an operator of the NOC 12, such that the operator may initiate trouble shooting, or adjust resource allocations within the system 10.

In addition, based on the download metrics, the NOC 12 computer 32 may command one or more terminals 18 to execute additional diagnostic tests. The diagnostic tests may include, e.g. checking CPU and memory usage of various processes, restarting processes that may be out of specification with expected behavior, reinitializing and reconfiguring terminal 18, reacquiring satellite signal and recalibrating timing and power needed to communicate with gateway 14 and executing a download and upload speed test with a computer 44 in gateway 14 after each of the listed steps Based on the test results, the computer 32 may open a service ticket for the terminals 18 and schedule a technician visit to repair the terminals 18. The process 200 ends following the block 295.

Upload Throughput Measurement

Figure 3:
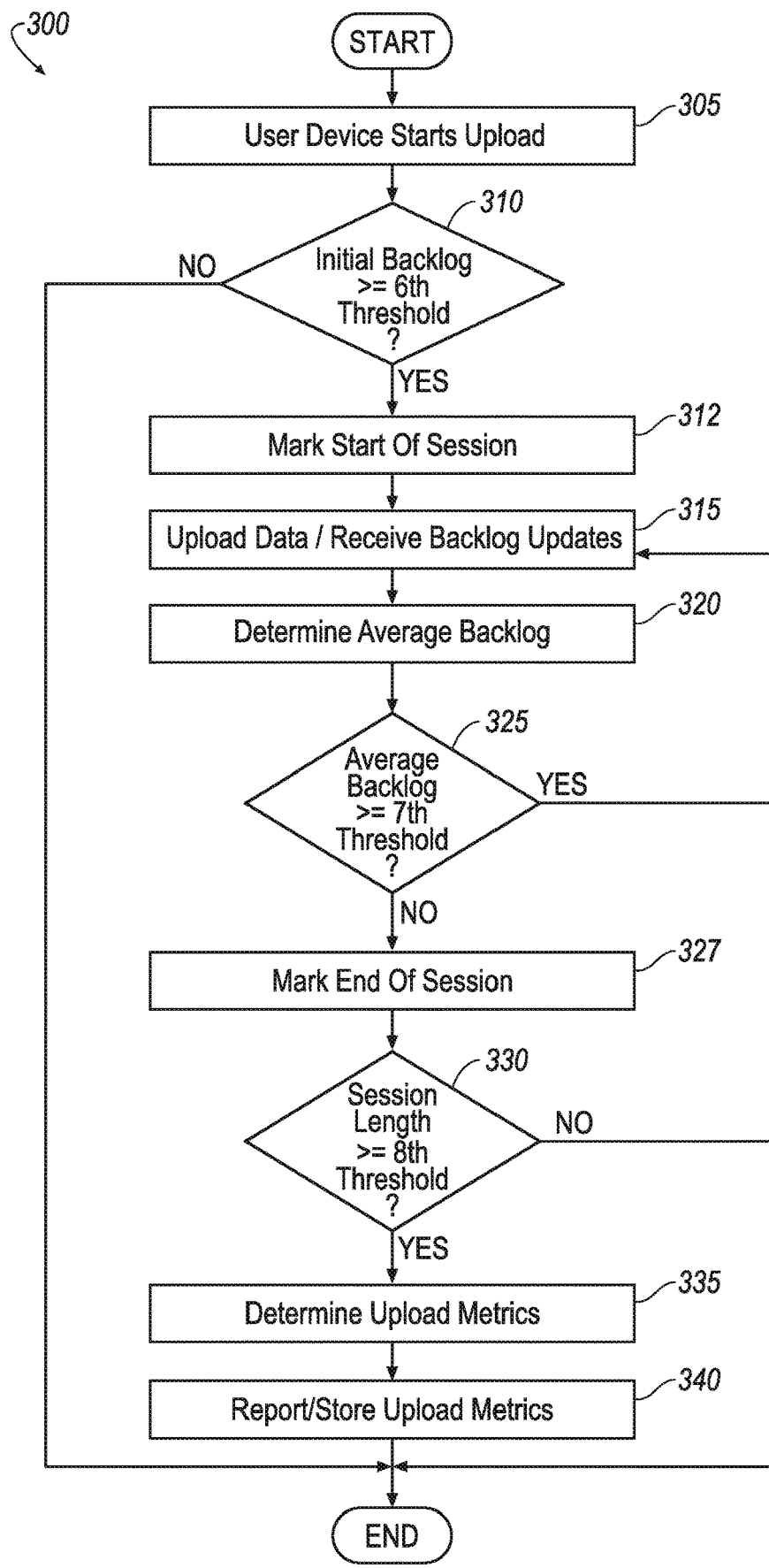
FIG. 3 is a diagram of an exemplary process for measuring upload throughput for a network.

Upload throughput is a metric for the speed at which data can be transferred from the user device 20 to the remote server 11, and is expressed in units of megabits per second (Mbits/s). The upload throughput measurement may be initiated and controlled by the gateway 14, e.g., according to programming in the computer 44. FIG. 3 is a diagram of an exemplary process 300 for measuring upload throughput. The process 300 starts in a block 305.

In the block 305, the remote server 11 receives, via the terminal 18, and the gateway 14, a request from the user device 20 to upload an item of media content, for example, a video recording. The item is typically uploaded in multiple chunks. As each chunk is forwarded from the user device 20 to terminal 18 for further transmission, the terminal 18 computer 54 makes a bandwidth request to the gateway 18 computer 44. The request may indicate the size (in megabytes) of the chunk of the media item that is ready for upload. Based on the request, the gateway 14 computer 44 may allocate bandwidth to the terminal 18 to upload the chunk of the media item. The gateway 14 computer 44 may further initiate monitoring of the upload session and an upload throughput measurement for the session. The upload session may be defined as the period of time from the beginning to the end of uploading the media content item. The process 300 continues in a block 305.

In the block 310, the gateway 14 determines whether the upload backlog is greater than or equal to a sixth predetermined threshold. The upload backlog may be defined as the amount of data queued in terminal 18 for uploading to gateway 14. The data queued for uploading, may be queued, for example, in an upload buffer associated with the user device 20. The sixth predetermined threshold may be a value that indicates that sufficient data will be transferred during the session for the upload throughput measurement to be meaningful. For example, the sixth predetermined threshold may be determined such that the length of the upload session will be a minimum of ten seconds at a target upload throughput.

In the case that the amount of backlog data in the terminal 18 is less than the sixth predetermined threshold, the upload throughput measurement may be discontinued. The process 300 then ends and no measurement of upload throughput will be made; however, the gateway 14 computer 44 will look for an opportunity to restart measurement during a later chunk of data upload. In the case, however, that the amount of backlog data is greater than or equal to the sixth predetermined threshold the process 300 continues in a block 312.

In the process 312, the gateway 14 computer 44 marks the start of the upload session. The process 300 continues in a block 315.

In the block 315, the gateway 14 computer 44 continues to upload data from the user device 20 via the terminal 18. During the upload session, the gateway 14 computer 44 may receive one or more updates regarding the amount of backlog data in the terminal 18. The gateway 14 may continue to receive updates until the media item has been uploaded and the upload session is ended. The process 300 continues in a block 320.

In the block 320, the gateway 14 computer 44 determines, based on the one or more updates regarding the amount of backlog data, one or more statistical values, such as, for example, an average amount of backlog data during the upload session and the total amount of data actually received from the terminal 18 during the upload session. The process continues in a block 325.

In the block 325, the gateway 14 computer 44 determines whether the average amount of backlog data during the current upload session was greater than or equal to a seventh predetermined threshold. The seventh predetermined threshold may be a value that indicates that there was sufficient backlog data in terminal 18 to continue the current upload session.

In the case that the average amount of backlog data is determined to be greater than or equal to the seventh predetermined threshold, the process 300 continues in the block 315.

In the case that the average amount of backlog data in the upload buffer is determined to be less than the seventh predetermined threshold, the gateway 14 computer 44 determines that the upload session has ended. The process 300 continues in a block 327.

In the block 327, the gate 14 computer 44 marks the end of the upload session. The process 300 continues in a block 330.

In the block 330, the gateway 14 computer 44 determines whether the length of the upload session was greater than or equal to an eighth predetermined threshold. The eighth predetermined threshold may be a minimum length for the upload session, such that the determined upload throughput is a good indication of system capability in a steady state condition. For example, the eighth predetermined threshold may be ten seconds. In the case that the gateway 14 determines that the upload session length is less than the eighth predetermined threshold, the gateway 14 computer 44 determines that the just ended upload session was a bad session and terminate the upload throughput measurement. The process 300 then ends.

In the case that the upload session length is greater than or equal to the eighth predetermined threshold, the gateway 14 computer 44 determines that the just ended upload session was long enough to generate a valid upload throughput measurement. The process continues in a block 335.

In the block 335, the NOC 12 computer 32 determines the upload metrics for the upload session. For example, the NOC 12 computer 32 may receive the upload throughput data for one or more upload sessions from the gateway 14. The NOC 12 computer 32 may calculate statistical values such as the average upload throughput, the maximum upload throughput, the minimum upload throughput, the standard deviation of the upload throughput, etc. corresponding to the one or more upload sessions received from the gateway 14. The process 300 continues in a block 340.

In the block 340, the NOC 12 computer 32 may store the upload metrics, e.g., in a memory associated with the computer 32. Additionally or alternatively, the NOC 12 computer 32 may issue reports or warnings to one or more of the communicatively coupled devices associated with the system 10, for example with the one or more gateways 14, one or more first networks 16, and one or more terminals 18. Specifically, in the case that the NOC 12 computer 32 determines that the upload throughput is outside of a specified range, the NOC 12 computer 32 may issue a warning, for example to an operator of the NOC 12, such that the operator may initiate trouble shooting, or adjust resource allocations within the system 10.

In addition, based on the upload metrics, the NOC 12 computer 32 may command one or more terminals 18 to execute additional diagnostic tests. The diagnostic tests may include, e.g. checking CPU and memory usage of various processes, restarting processes that may be out of specification with expected behavior, reinitializing and reconfiguring terminal 18, reacquiring satellite signal and recalibrating timing and power needed to communicate with gateway 14 and executing a download and upload speed test with a computer 44 in gateway 14 after each of the listed steps Based on the test results, the computer 32 may open a service ticket for the terminals 18 and schedule a technician visit to repair the terminals 18. The process 300 then ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a first computing device, including a processor and a memory, the memory storing instructions executable by the processor such that the processor is programmed to:

receive a request to upload data, the request including a first amount of data to be uploaded, the first amount of data indicating an amount of data that is queued in an upload buffer and ready to be uploaded at a beginning of or just prior to an upload session;

initiate, based on a determination that the first amount of data is greater than or equal to a first predetermined threshold, a measurement of a session upload throughput rate;

receive, during the upload session, one or more messages including respective second amounts of data, each of the second amounts of data indicating an amount of data queued in the upload buffer to be uploaded at a respective time during the upload session;

calculate, based on the second amounts of data, a current average backlog wherein the current average backlog is an average amount of data queued in the upload buffer during the upload session;

determine, based on the current average backlog being less than a second predetermined threshold, an end of the upload session;

calculate, based on the determination of the end of the upload session, the first amount of data and the second amounts of data, the session upload throughput rate; and transmit the session upload throughput rate to a second computing device.

2. The system of claim 1, wherein the processor is further programmed to:

receive, from the second computing device, an instruction to instruct a remote terminal to perform a diagnostic test;

send an instruction to the remote terminal to conduct the diagnostic test;

receive a result for the diagnostic test from the remote terminal, and send the result of the diagnostic test to the second computing device.

3. The system of claim 1, further comprising the second computing device, wherein the second computing device includes a processor and a memory, the memory of the second computing device storing instructions executable by the processor of the second computing device such that the processor of the second device is programmed to:
  receive one or more session upload throughput rates;
  calculate a statistical value related to the one or more session upload throughput rates; and
  store the statistical values.

4. The system of claim 3, wherein the processor of the second computing device is further programmed to:
  send, based on the statistical values, a request to the first computing device instructing the first computing device to instruct a remote terminal to perform a diagnostic test.

5. The system of claim 4, wherein the processor of the second computing device is further programmed to:
  receive, from the first computing device, results from the diagnostic test; and
  based on the results, issue a work order for service of the remote terminal.

6. The system of claim 5, further comprising the remote terminal, wherein the remote terminal includes a processor and a memory, the memory of the remote terminal storing instructions executable by the processor of the remote terminal such that the processor of the remote terminal is programmed to:
  receive an instruction from the first computing device to perform a diagnostic test;
  perform the diagnostic test; and
  send the result of the diagnostic test to the first computing device.

7. The system of claim 4, wherein the diagnostic test includes at least one from a set of (1) checking processor and memory usage of various processes in the remote terminal, (2) restarting processes in the remote terminal that may be out of specification, (3) reinitializing and reconfiguring the remote terminal, and (4) reacquiring a satellite signal and recalibrating timing and power needed to communicate with the first computing device.

8. The system of claim 7, wherein the diagnostic test further includes executing an upload throughput test following the at least one from the set of (1) checking the processor and the memory usage of the various processes in the remote terminal, (2) restarting the processes in the remote terminal that may be out of specification, (3) reinitializing and reconfiguring the remote terminal, and (4) reacquiring the satellite signal and the recalibrating timing and power needed to communicate with the first computing device.

9. The system of claim 1, wherein the processor is further programmed to:
  calculate a length of the upload throughput session; and
  determine, based on a determination that the length of the upload session is greater than or equal to a third predetermined threshold, that the upload session contains sufficient data for calculating the upload throughput rate, wherein
  transmitting the session upload throughput rate to the second computing device is based on determining that the upload session contains sufficient data.

10. The system of claim 1, wherein the processor is further programmed to:
  calculate a length of the upload throughput session; and
  determine, based on a determination that the length of the upload session is greater than or equal to a third predetermined threshold, that the upload session contains sufficient data for calculating the upload throughput rate, wherein
  transmitting the session upload throughput rate to the second computing device is based on determining that the upload session contains the sufficient data.

11. A method comprising:
  receiving a request to upload data, the request including a first amount of data to be uploaded, the first amount of data indicating an amount of data that is queued in an upload buffer and ready to be uploaded at a beginning of or just prior to an upload session;
  initiating, based on a determination that the first amount of data is greater than or equal to a first predetermined threshold, a measurement of a session upload throughput rate;
  receiving during the upload session, one or more messages including respective second amounts of data, each of the second amounts of data indicating an amount of data queued in the upload buffer to be uploaded at a respective time during the upload session;
  calculating, based on the second amounts of data, a current average backlog wherein the current average backlog is an average amount of data queued in the upload buffer during the upload session;
  determining, based on the current average backlog being less than a second predetermined threshold, an end of the upload session;
  calculating, based on the determination of the end of the upload session, the first amount of data, and the second amounts of data, the session upload throughput rate; and
  transmitting, by the first computing device, the session upload throughput rate to a second computing device.

12. The method of claim 11, further comprising:
  receiving, from the second computing device, an instruction to instruct a remote terminal to perform a diagnostic test;
  sending an instruction to the remote terminal to conduct the diagnostic test;
  receiving a result for the diagnostic test from the remote terminal, and
  sending the result of the diagnostic test to the second computing device.

13. The method of claim 11, further comprising:
  receiving, by the second computing device, one or more session upload throughput rates;
  calculating, by the second computing device, a statistical value related to the one or more session upload throughput rates; and
  storing, by the second computing device, the statistical values.

14. The method of claim 13, further comprising:
  sending, by the second computing device, based on the statistical values, a request to the first computing device instructing the first computing device to instruct a remote terminal to perform a diagnostic test.

15. The method of claim 14, further comprising:
  receiving, by the second computing device, from the first computing device, results from the diagnostic test; and
  based on the results, issuing, by the second computing device, a work order for service of the remote terminal.

16. The method of claim 15, further comprising:
  receiving, by the remote terminal, an instruction from the first computing device to perform a diagnostic test;
  performing, by the remote terminal, the diagnostic test; and
  sending, by the remote terminal, the result of the diagnostic test to the first computing device.

17. The method of claim 14, wherein the diagnostic test includes at least one from a set of (1) checking processor and memory usage of various processes in the remote terminal, (2) restarting processes in the remote terminal that may be out of specification, (3) reinitializing and reconfiguring the remote terminal, and (4) reacquiring a satellite signal and recalibrating timing and power needed to communicate with the first computing device.

18. The method of claim 17, wherein the diagnostic test further includes executing an upload throughput test following the at least one from the set of (1) checking the processor and the memory usage of the various processes in the remote terminal, (2) restarting the processes in the remote terminal that may be out of specification, (3) reinitializing and reconfiguring the remote terminal, and (4) reacquiring the satellite signal and the recalibrating timing and power needed to communicate with the first computing device.

19. The method of claim 11, further comprising:
calculating a length of the upload throughput session; and
determining, based on a determination that the length of the upload session is greater than or equal to a third predetermined threshold, that the upload session contains sufficient data for calculating the upload throughput rate, wherein
transmitting the session upload throughput rate to the second computing device is based on determining that the upload session contains sufficient data.

\* \* \* \* \*